United States Patent [19]

Fucci

[11] Patent Number: 4,705,442
[45] Date of Patent: Nov. 10, 1987

[54] QUARTER TURN FASTENER

[75] Inventor: Joseph G. Fucci, Abington, Mass.

[73] Assignee: TRW Inc., Cleveland, Ohio

[21] Appl. No.: 848,492

[22] Filed: Apr. 7, 1986

[51] Int. Cl.$^4$ ............................................. F16B 19/00
[52] U.S. Cl. ...................................... 411/510; 24/453; 403/408.1; 411/553
[58] Field of Search .............................. 411/508–510, 411/349, 549, 550, 552, 553; 24/297, 453, 618, 326; 403/408.1, 405.1

[56] References Cited

U.S. PATENT DOCUMENTS

| | | | |
|---|---|---|---|
| 2,181,966 | 12/1939 | Dean | 411/508 X |
| 2,552,066 | 5/1951 | Sorensen | 24/217 |
| 2,754,561 | 7/1956 | Bedford | 24/618 |
| 3,010,353 | 11/1961 | Psaros | 85/21 |
| 3,123,389 | 3/1964 | Biesecker | 411/349 X |
| 3,220,078 | 11/1965 | Preziosi | 411/349 |
| 3,393,431 | 7/1968 | Saunders | 411/508 |
| 3,889,320 | 6/1975 | Koscik | 24/297 |
| 3,988,808 | 11/1976 | Poe et al. | 24/326 |
| 4,007,516 | 2/1977 | Coules | 24/221 |
| 4,261,243 | 4/1981 | Palmer | 411/510 |
| 4,262,394 | 4/1981 | Wright | 24/73 |
| 4,342,139 | 8/1982 | Tanaka | 24/297 X |
| 4,392,278 | 7/1983 | Mugglestone | 411/510 X |
| 4,396,329 | 8/1983 | Wollar | 411/508 |
| 4,402,641 | 9/1983 | Arff | 411/510 |
| 4,427,328 | 1/1984 | Kojima | 411/508 |
| 4,531,870 | 7/1985 | Moryl et al. | 24/453 X |

FOREIGN PATENT DOCUMENTS

| | | | |
|---|---|---|---|
| 1375585 | 10/1964 | France | 411/508 |
| 982603 | 2/1965 | United Kingdom | 403/408 |

Primary Examiner—Lloyd A. Gall
Attorney, Agent, or Firm—Fay, Sharpe, Beall, Fagan, Minnich & McKee

[57] ABSTRACT

A quarter-turn fastener adapted for selective connection to a support member through a generally rectangular opening. The disclosed fastener comprises a body having a head and an axially elongated, rigid shank. Extending radially outward from the shank are two series of resilient leg members. The leg members in each series are axially spaced and configured to be readily deflectable toward the head but to offer substantial resistance to deflection away from the head. Wing-like stop members are joined to the shank at positions spaced circumferentially of the leg members for centering the fastener in the opening and limiting its rotation about the axis of the shank to a single predetermined direction.

18 Claims, 8 Drawing Figures

QUARTER TURN FASTENER

BACKGROUND OF THE INVENTION

The present invention is directed toward the fastener art and, more particularly, to a fastener of the type generally referred to as a quarter-turn fastener.

Quarter-turn fasteners are widely used to releasably connect panels and other components to an associated support panel or similar structure. The fasteners are designed such that, as their name implies, they can be shifted from an engaged or locked position to a release position by a simple 90° rotation about their longitudinal axis.

While many designs of such fasteners have been proposed in the prior art, the prior designs generally suffer from disadvantages which limit their usefulness. For example, many of the designs require two or more separate components which, of course, results in increasing their cost and complicating their installation. In addition, also for example, those prior quarter-turn fasteners which are single component designs are severely limited in their ability to function with differing panel or support structure thicknesses. That is, the fasteners function properly only when the total thickness of the panel and the support structure is in a very limited range. In fact, with some of the designs not only does the total thickness of the panel and support structure need to be held to close tolerances, but the relative thicknesses of each of the two components must remain constant. Consequently, each change in the total thickness and/or the relative thicknesses of the components being joined requires a different size fastener.

BRIEF DESCRIPTION OF THE INVENTION

The subject invention overcomes the above-mentioned problems and disadvantages, and provides a single component, quarter-turn fastener which is simple in design and which is not affected by even significant variations in the total or relative thicknesses of the components being joined.

In accordance with the present invention, there is provided a quarter-turn fastener adapted for selective connection to a support member through an opening having a width "w" and a length "l" which is greater than "w". The preferred form of the fastener comprises an enlarged head portion having an axially elongated, relatively rigid shank extending therefrom. A series of axially spaced, resilient leg members extend outwardly of the shank along a first side thereof. Each leg member has an outer terminal end configured to be relatively readily deflectable in directions toward the head but to offer substantial resistance to deflection in directions away from the head. The maximum width of the fastener when measured on a line passing perpendicularly through the axis of the shank and intersecting the terminal end of one of the leg members is greater than "w" but not significantly greater than "l". Also carried by the shank and extending outwardly therefrom is a stop means for permitting rotation of the fastener in only one direction about the shank when the fastener is in an engaged position in the opening in the support member.

Preferably, and in accordance with a more limited aspect, the stop means comprises a resilient, wing-like member having a base joined to the shank and an outer end portion which is spaced radially outward and circumferentially offset from the base. The outer end portion is arranged to engage an edge of the support member opening when the fastener is in an engaged position.

The relationship between the resilient leg members and the wing-like stop member allows the shank of the fastener to be simply inserted axially into the opening in the support plate. To install the fastener, the leg members can be positioned to extend across the width dimension of the opening. When forced into the opening the leg members deflect toward the head during insertion to allow passage through the opening. As the individual leg members emerge from the opening on the opposite side of the support, they resiliently spring back to their normal extended position and strongly resist the reverse deflection which would be necessary to allow direct axial withdrawal of the fastener. However, if the fastener is rotated to align the leg members with the length dimension of the opening, axial withdrawal can be easily accomplished. The direction in which the necessary rotation can take place is, however, limited by the stop means. This provides a positive, predetermined relationship between the engaged and release positions.

Accordingly, a primary object of the invention is the provision of a quarter-turn fastener which can be a relatively simple one piece component capable of fastening panels or parts of widely varying thicknesses.

A further object is the provision of a fastener of the type described which can be readily molded from a variety of resilient resinous or plastic materials.

Another object is the provision of a quarter-turn fastener wherein the stop means for limiting rotation to a single direction also functions to center the fastener in the support opening.

BRIEF DESCRIPTION OF THE DRAWINGS

The above and other objects and advantages will become apparent from the following description when read in conjunction with the accompanying drawings wherein.

DETAILED DESCRIPTION OF THE PREFERRED EMBODIMENT

Figure 1:
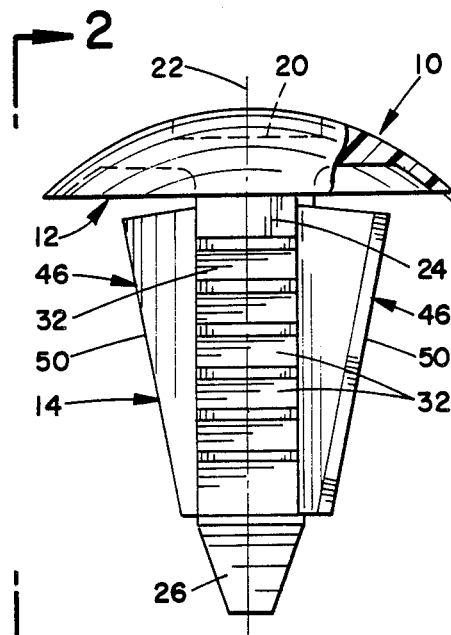
FIG. 1 is an elevational view of a quarter-turn fastener formed in accordance with a preferred embodiment of the invention.

Referring more particularly to the drawings wherein the showings are for the purpose of illustrating a preferred embodiment of the invention only and not for the purpose of limiting same, FIGS. 1-4 best illustrate the overall construction of a quarter-turn fastener 10 formed in accordance with the subject invention. Although, as will become apparent, the fastener could be formed from a variety of materials, the design is such that it is especially suited for manufacture as a single component structure by injection molding from a plastic or resilient, resinous material such as nylon or polyethylene.

The illustrated fastener 10 comprises an enlarged head or head portion 12 integrally joined with an axially extending, relatively rigid shank 14. The head portion 12 preferably has an upwardly domed, generally hemispherical configuration which terminates in a relatively thin, circular outer peripheral edge 16. The upper central section of head portion 12 is provided with a transversely extending, tool receiving slot 20 formed therein. For reasons which will subsequently be discussed, the head portion 12 is preferably formed such that the outer edge 16 is resiliently deflectable in directions generally parallel to the axis 22.

The shank 14 is formed integrally with the head portion 12 and comprises a solid, relatively inflexible, generally rectangular shank body 24 which extends axially of head portion 12 and terminates in a pointed outer free end 26. Extending axially of the shank body 24 are two series 28 and 30 of resilient, flexible leg members 32. The leg members 32 in each series are preferably positioned in axial alignment and extend generally radially of the shank 24. Desirably, the leg members 32 are molded integrally with the shank body and are configured to have a cross-section which tapers from a relatively rigid base portion 34 to a flexible, outer free end portion 36. Preferably, and for reasons which will subsequently become apparent, the leg members 32 are inclined in a direction toward head portion 12.

Figure 8:
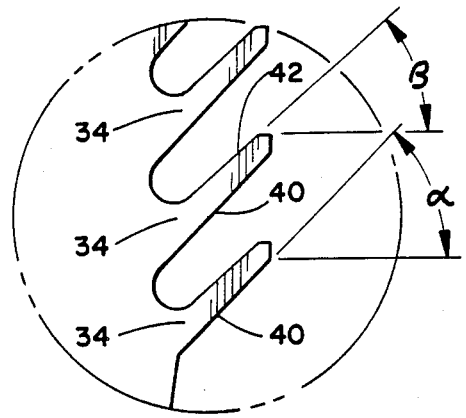

FIG. 8 shows the preferred shape of the individual leg members 32. In particular, the under surface 40 of each leg member 32 makes an angle of alpha of approximately 45° relative to a plane perpendicular to the axis 22. The upper faces 42 preferably lie at an angle beta which is approximately 40° relative to a plane perpendicular to axis 22.

Although the leg members could have other configurations from that shown and described, it is important that their design permits them to be resiliently deflectable in directions toward the head 12 while presenting substantial resistance to deflection in directions away from the head 12.

Figure 2:
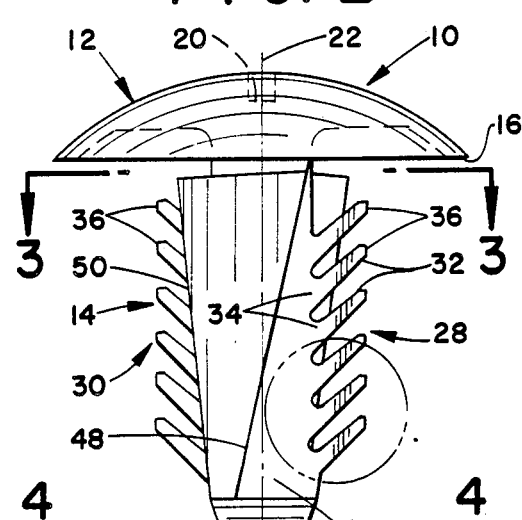
FIG. 2 is an elevational view taken on line 2—2 of FIG. 1.
Figure 3:
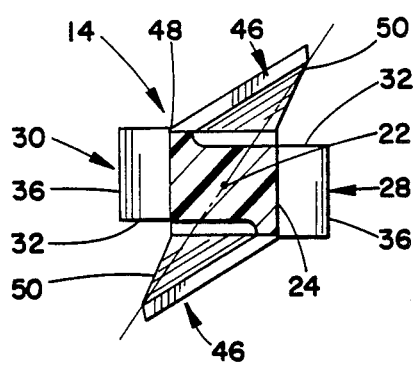
FIG. 3 is a cross-sectional view taken on line 3—3 of FIG. 2.
Figure 4:
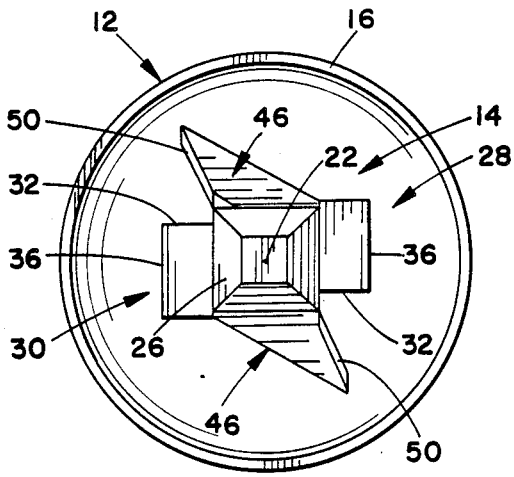
FIG. 4 is an end view taken on line 4—4 of FIG. 2.

Also carried by shank body 24 are generally longitudinally extending wing-like members 46. In the embodiment under consideration, the wing-like members 46 extend from opposite sides of body 24 in generally parallel planes and have identical configurations. Each of the wing-like members 46 is shown as including a relatively rigid base portion 48 which extends generally longitudinally of the shank body 24 but at a slight inclination as best shown in FIG. 2. The bodies of members 46 are relatively thin and resilient and extend from base portion 48 outwardly to a free edge portion 50 which is located radially outward and circumferentially offset from their respective base portion 48. In addition, it is preferred that the free edge portions 50 be generally parallel to axis 22 as shown in FIGS. 3 and 4.

Figure 5:
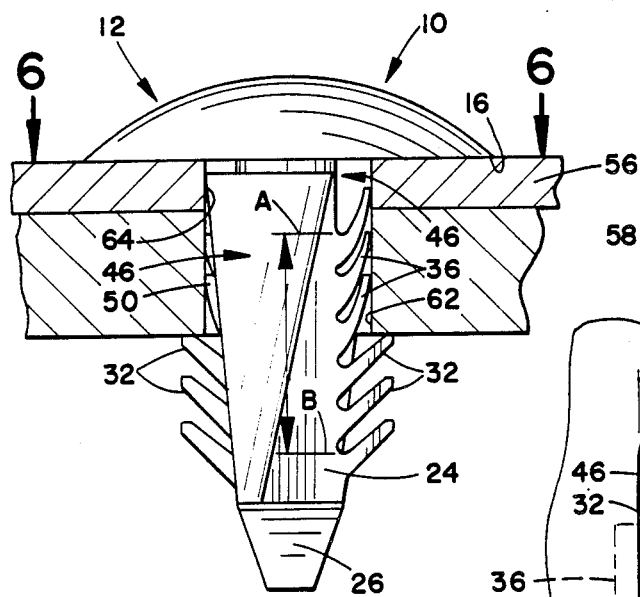
FIG. 5 is a view showing the fastener of FIG. 1 in operative relationship joining a panel or other member with a support piece.
Figure 6:
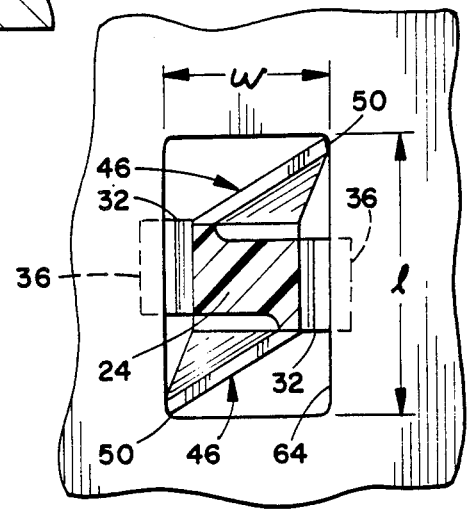
FIG. 6 is a view taken on line 6—6 of FIG. 5.
Figure 7:
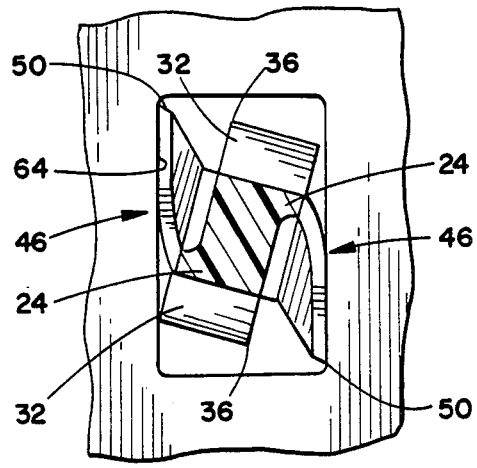
FIG. 7 is a view similar to FIG. 6 but showing the fastener rotated to a release position; and, FIG. 8 is an enlarged view of the circled area in FIG. 2.

FIGS. 5-7 illustrate the manner of use of the fastener of the subject invention. FIG. 5 shows the fastener 10 in its installed and engaged position joining a relatively thin panel member 56 to a somewhat thicker support member 58. To allow the fastener 10 to function in its intended manner, support member 58 and the panel member 56 are provided with aligned openings 62, 64, respectively, through which the fastener is inserted. Although the openings 62, 64 could vary somewhat from that shown, they both preferably have a generally rectangular configuration as best seen in FIG. 6. Specifically, the openings preferably have a width "w" which is substantially less than the maximum width of the fastener measured on a line which passes through the axis 22 and intersects the free end portions 36 of the legs 32. The length "l" of the openings is greater than "w" and preferably at least no less than the maximum width of the fastener measured on a line passing through the axis and intersecting the free ends 36 of the leg members 32. With openings of a suitable size provided and the opening 64 in the panel member 56 aligned with the opening 62 in the support member 58, the fastener 10 can be positioned in axial alignment with the openings and with its leg members 32 extending in a direction across the width "w". When oriented in this manner the fastener can be forced axially through the openings. As the fasterner 10 moves through the openings the individual leg members 32 resiliently deflect toward the head portion 12 to permit relatively free passage. As the individual leg members exit through the underside of support member 58 they spring out to their normal extended position as best seen in FIG. 5. When any of the leg members 32 have returned to their normal position on the underside of member 58, direct axial withdrawal of the fastener cannot take place because the leg members 32 strongly resist deflection in a direction away from head 12.

Those leg members 32 which remain within the opening after engagement takes place as shown in FIGURE 5 function to maintain a lateral bias on the fastener tending to center it across the width of the opening. In addition, the biasing provides the fastener with significant vibration dampening.

In addition to the lateral biasing produced by the leg members remaining in the opening, the resilient nature of the head 12 allows its outer peripheral edge 16 to deflect upwardly during the final stage of insertion of the fastener. The head portion thus applies an upward axial bias to the fastener to maintain the extended leg members 32 firmly biased into engagement with the underside of support member 58.

As can be appreciated, the total thickness of components which the fastener can join is primarily limited only by the length of the shank and the axial extent of the flexible leg member 36. For example, the fastener shown in FIG. 5 could join assemblies in a range of thicknesses between A and B.

So long as the fastener's orientation relative to the openings remains as in FIG. 5, it cannot be axially withdrawn except by destruction of the extended leg members 32 on the underside of support member 58. However, if the fastener is rotated to a position to generally align the leg members with the "l" dimension of the openings 62, 64 disengagement takes place and axial withdrawal is readily possible.

In accordance with the subject invention, the previously discussed wing-like members 46 are arranged to center the fastener both longitudinally and transversely in the opening and to function as stop means for preventing undesired rotation and limiting selective manual rotation to a single direction about axis 22. As best shown in FIG. 6, the positioning and arrangement of the wing-like members 46 is such that their outer free edges 50 engage the edge of the opening in diagonally opposite corners. The wing-like members thus perform a centering function both during insertion and while the fastener is in an engaged position in the opening. Additionally, it should be noted that the wing like members 46, because of their orientation and relation to the shank body 24, prevent rotation of the fastener in a clockwise direction about axis 22. That is, when an attempt is made to rotate the fastener clockwise, the members 46 act as toggles since any deflection they undergo with attempted clockwise rotation causes the distance between their respective free ends to increase. This has the effect of shifting the resultant force acting against them to a position wherein it is primarily compressive and must produce actual compression of the members before further clockwise rotation can be achieved.

With attempted counterclockwise rotation however, the wing-like members can resiliently deflect in directions such that their free edges can move generally toward the body of the shank 24 and the total diagonal distance between their respective free ends decreases as required to permit rotation to the FIG. 7 position. The initial attempt to rotate the fastener counterclockwise is also resisted to some lesser extent by the leg members 36 which are in a deflected condition within the opening. As best seen in FIG. 6, the leg members in each series are offset from the bisecting plane "p" to act as an initial lock against counterclockwise rotation. With increasing application of torque this initial locking is, of course, overcome by further deflection of the deflected legs within the opening.

With the fastener in the FIG. 7 position the leg members 32 are generally aligned with the length "l" of the opening and the entire transverse cross-section of the shank, the leg members, and the wing-like members lies within the area of openings 62 and 64. Simple axial withdrawal of the fastener can then take place.

The amount of force required to rotate the fastener in a counterclockwise direction can be varied by varying the rigidity of the wing-like members 46. Preferably, the wing-like members are sufficiently rigid to prevent rotation from the normal vibrations and external forces which the assembly would be expected to encounter in use, but not so rigid as to significantly impede the desired counterclockwise rotation required for release.

Although the preferred method of installing the fastener 10 is direct axial insertion to the final engaged position as described above with reference to FIG. 6, the fastener can also be installed by orienting it as shown in FIG. 7, inserting it completely into the opening, and then rotating it approximately one-quarter turn counterclockwise until it assumes the FIG. 6 position.

In addition, although the fastener shown is arranged for counterclockwise release, it could be made for clockwise release merely be reversing the orientation of the wing-like members.

The invention has been described in great detail sufficient to enable one of ordinary skill in the art to make and use the same. Obviously, modifications and alterations of the preferred embodiment will occur to others upon a reading and understanding of the specification. It is intended to include all such modifications and alterations insofar as they come within the scope of the appended claims or the equivalents thereof.

Having thus described the invention, it is now claimed:

1. A fastener comprising:
   an enlarged head portion;
   an axially elongated, relatively rigid shank extending from said head portion;
   a first series of leg members joined to said shank and extending generally radially therefrom, said leg members being axially spaced and readily deflectable in a direction toward said heat portion but offering substantial resistance to deflection in a direction away from said head portion; and,
   a first resilient wing-like member having a relatively rigid base portion extending along said shank at an angle relative to the axis of said shank, said wing-like member having a body which is relatively flexible and resilient and which extends radially from said base to a free end portion which lies at a location spaced radially outward and circumferentially offset from said base portion, said wing-like member being deflectable in directions toward said shank but substantially resisting deflection in directions away from said shank.

2. The fastener as defined in claim 1 including a second series of leg members joined to said shank on the side opposite said first series.

3. The fastener as defined in claim 2 including a second resilient wing-like member carried by said shank on the side opposite said first wing-like member.

4. The fastener as defined in claim 3 wherein said second resilient wing-like member has a configuration corresponding to the configuration of said first wing-like member and wherein the free end portions of said first and second wing-like members lie on opposite sides of said shank in a plane which generally includes the axis of said shank.

5. The fastener as defined in claim 4 wherein the leg members have terminal ends and wherein the maximum distance between the terminal ends of said leg members measured on a line perpendicular to the axis of said shank is less than the maximum distance between the free end portions of said first and second wing-like members also measured on a line perpendicular to the axis of said shank.

6. A quarter-turn fastener connected to a support member through a substantially rectangular opening having a width "w" and a length "l" which is greater than "w"; said fastener comprising:
   a body having a head and an axiallly elongated, relatively rigid shank extending from said head through said opening;
   leg means joined to said shank and extending generally radially therefrom, said leg means being readily deflectable in a direction toward said head but substantially resisting deflection in a direction away from said head;
   the combined width of said shank and said leg means in their undeflected condition when measured in a direction transverse to the axis of said shank being greater than "w" but not substantially greater than "l" such that when said shank is in a first axially rotated position with said leg means extending in the width direction of said opening at least some of said leg means are in an undeflected position extending beyond the periphery of said opening to prevent axial withdrawal of said fastener but when said shank is in a second axially rotated position with said leg means extending generally in the length direction of said opening said fastener can be freely axially withdrawn from said opening; and,
   stop means extending outwardly from said shank at a location circumferentially spaced from said leg means and having a free end portion in engagement with an edge of said opening for preventing axial rotation of said shank in said opening in a first direction while permitting rotation in a direction opposite said first direction.

7. The fastener as defined in claim 6 wherein said leg means comprise at least one series of individual leg members spaced axially along said shank.

8. The fastener as defined in claim 6 wherein said leg means comprise two series of individual leg members lying on generally opposite sides of said shank, each series comprising a plurality of said individual leg members spaced axially along said shank.

9. The fastener as defined in claim 8 wherein each said series is offset relative to a bisecting plane which includes the centerline of said shank.

10. The fastener as defined in claim 8 wherein said stop means comprises a pair of resilient wing members joined to said shank on generally opposite sides thereof.

11. The fastener as defined in claim 10 wherein each of said resilient wing members has a base portion joined to said shank to extend axially thereof, each said resilient wing member further defining said free end portion to lie at a location spaced radially outward and circumferentially offset from said base portion.

12. The fastener as defined in claim 11 wherein said fastener is a unitary, molded component formed from a resilient, resinous material.

13. The fastener as defined in claim 6 wherein said stop means comprises at least one resilient wing-like member joined to said shank and extending radially thereof to define said free end portion.

14. The fastener as defined in claim 13 wherein said resilient wing member is configured to facilitate deflection of said free end portion in directions generally toward said shank but to offer substantial resistance to deflection in directions away from said shank.

15. A quarter-turn fastener connected to a support member through a substantially rectangular opening extending between exterior faces of said support member, said opening having a width "w" and a length "l" which is greater than "w", said fastener comprising:
a body having a head and an axially elongated shank extending from said head through said opening;
a first series of axially spaced resilient leg members extending outwardly from said shank along a first side thereof, each said leg member having a terminal end and being configured to be relatively readily deflectable in a direction toward said head but offering substantial resistance to deflection in a direction away from said head;
the maximum width of said fastener when measured on a line passing generally perpendicularly through the axis of the shank and intersecting the terminal end of one of said leg members being greater than "w" but not substantially greater than "l" such that when said shank is in a first axially rotated position with said leg members extending in the width direction of said opening at least some of said leg members are in an undeflected position extending beyond the periphery of said opening on the exterior face of said support member opposite said head to prevent axial withdrawal of said fastener but when said shank is in a second axially rotated position with said leg members extending generally in the length direction of said opening said fastener can be freely axially withdrawn from said opening;
stop means carried by said shank at least at a location closely adjacent said head and extending outwardly from said shank into engagement with the periphery of said opening for permitting rotation of said fastener in only a first direction about the axis of said shank when said shank is received in the opening in said support member.

16. The fastener as defined in claim 15 wherein said stop means comprises a resilient, wing-like member which has a base portion joined to said shank and an outer end portion which is located radially outward of the base portion at a location circumferentially spaced from said base.

17. The fastener as defined in claim 16 wherein said outer end portion of said wing-like member is located to engage a corner of the opening in the support member when the fastener is in said first axially rotated position.

18. The fastener as defined in claim 16 wherein said wing-like member is arranged and configured to facilitate deflection of said outer end portion thereof in a direction toward said shank while providing substantial resistance to deflection in a direction away from said shank.

* * * * *